(12) United States Patent
Cook

(10) Patent No.: US 7,763,857 B2
(45) Date of Patent: Jul. 27, 2010

(54) INFRARED IMAGING OPTICAL SYSTEM WITH VARYING FOCAL LENGTH ACROSS THE FIELD OF VIEW

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 41 days.

(21) Appl. No.: 12/035,278

(22) Filed: Feb. 21, 2008

(65) Prior Publication Data

US 2009/0212219 A1 Aug. 27, 2009

(51) Int. Cl.
G01J 5/02 (2006.01)
(52) U.S. Cl. ...................................... 250/349
(58) Field of Classification Search .............. 250/338.1, 250/351, 353
See application file for complete search history.

(56) References Cited

U.S. PATENT DOCUMENTS

| | | | | |
|---|---|---|---|---|
| 4,136,954 A | * | 1/1979 | Jamieson | 356/456 |
| 4,299,452 A | * | 11/1981 | Ikemori | 359/681 |
| 4,487,473 A | | 12/1984 | Hatch et al. | |
| 4,600,265 A | * | 7/1986 | Norrie | 359/351 |
| 4,679,891 A | * | 7/1987 | Roberts | 359/357 |
| 4,935,629 A | | 6/1990 | Livermore et al. | |
| 5,071,235 A | * | 12/1991 | Mori et al. | 359/692 |
| 5,446,581 A | * | 8/1995 | Jamieson | 359/357 |
| 5,502,592 A | * | 3/1996 | Jamieson | 359/355 |
| 6,424,460 B1 | * | 7/2002 | Kirkham | 359/353 |
| 6,547,406 B1 | | 4/2003 | Greenaway et al. | |
| 6,825,993 B2 | * | 11/2004 | Noda | 359/749 |
| 6,989,537 B2 | | 1/2006 | Cook | |
| 7,312,429 B2 | * | 12/2007 | Guyer et al. | 250/203.6 |
| 7,382,545 B2 | * | 6/2008 | Jung et al. | 359/666 |
| 2005/0103999 A1 | * | 5/2005 | Cook | 250/353 |
| 2005/0243411 A1 | * | 11/2005 | Cook | 359/363 |
| 2005/0270660 A1 | * | 12/2005 | Chen et al. | 359/668 |
| 2006/0023105 A1 | * | 2/2006 | Kostrzewski et al. | 348/335 |

* cited by examiner

Primary Examiner—David P Porta
Assistant Examiner—Djura Malevic
(74) Attorney, Agent, or Firm—Pillsbury Winthrop Shaw Pittman LLP

(57) ABSTRACT

Provided is an infrared imaging optical system with an advantageously varying focal length across the field of view. More specifically, in a particular embodiment, provided is an inverse telephoto lens group having a field of view on the order of at least two radians. The focal length of the lens group is structured and arranged to vary in a pre-determined fashion across the field of view. An IR detector is optically coupled to the inverse telephoto lens group. A pupil is disposed between the IR detector and the inverse telephoto lens group.

23 Claims, 5 Drawing Sheets

FIG. 5

| Surface | Description | RD | CC | AD | AE | AF | AG | Thickness | Material | Comment |
|---|---|---|---|---|---|---|---|---|---|---|
| 0 | focus (114) | inf | - | - | - | - | - | 2.591 | air | diameter 4.000 |
| 1 | stop (106) | inf | - | - | - | - | - | 0.053 | air | diameter 1.036 |
| 2 | window (126) | inf | - | - | - | - | - | 0.106 | Si | diameter 1.574 |
| 3 | window (126) | inf | - | - | - | - | - | 0.068 | air | |
| 4 | corrector (164) | inf | - | -1.28626E-02 | 4.73072E-04 | -1.36089E-02 | 1.31317E-02 | 0.400 | Ge | diameter 1.788 |
| 5 | corrector (164) | -15.432 | - | - | - | - | - | 0.350 | air | |
| 6 | lens 1 (162) | -5.620 | - | - | - | - | - | 0.849 | Si | diameter 2.900 |
| 7 | lens 1 (162) | -3.427 | - | -9.68608E-03 | -1.57196E-03 | -1.53006E-04 | 1.02908E-04 | 0.078 | air | |
| 8 | lens 2 (158) | -5.519 | - | - | - | - | - | 0.850 | Sapphire | diameter 3.300 |
| 9 | lens 2 (158) | 54.036 | - | -1.64453E-02 | 3.61243E-03 | 1.82501E-04 | -6.24933E-05 | 0.374 | air | |
| 10 | lens 3 (156) | -47.542 | - | - | - | - | - | 0.850 | Si | diameter 3.700 |
| 11 | lens 3 (156) | -5.358 | -0.298334 | 7.24620E-03 | 2.31283E-06 | -4.56512E-05 | 3.40742E-05 | 13.570 | air | |
| 12 | lens 4 (152) | -10.689 | - | -1.50484E-04 | -1.14756E-06 | -3.50849E-08 | -7.15504E-11 | 0.670 | ZnSe | diameter 15.000 |
| 13 | lens 4 (152) | - | - | - | - | - | - | 1.000 | air | |
| 14 | object space (110) | inf | - | - | - | - | - | - | air | |

INFRARED IMAGING OPTICAL SYSTEM WITH VARYING FOCAL LENGTH ACROSS THE FIELD OF VIEW

FIELD

This invention relates generally to the field of infrared sensors, and more specifically to an inverse-telephoto infrared optical system that has a predetermined varying focal length across the field of view.

BACKGROUND

Infrared imaging optical systems are typically used to view and image light energy in the infrared optical spectrum. The production of infrared light is typically associated with the production or release of heat by hot objects such as engines and living mammals, such as for example human beings.

Infrared energy is capable of transmission through many conditions which would otherwise block visible light, such as clouds of particulate matter, water vapor, vegetation covering and various forms of optical camouflage. With respect to engines and the heat of mechanical or chemical systems, infrared detection can be highly beneficial.

Missiles fired at an aircraft may be detected by the heat and corresponding infrared signatures produced by their engines regardless of whether the missile is guided by an active or passive targeting system. Aircraft that are potentially targets for such missiles may carry infrared warning devices that view the exterior world in search of heat signatures that are associated with the engines of such missiles. Upon the detection of such a missile, such systems provide advance warning to the pilot and crew.

These sorts of detection systems may be enhanced by the ability to clearly detect and resolve an infrared emitting object, but in many instances mere detection is sufficient. However, there are a growing number of instances where mere detection of an infrared source is not enough, rather it is highly desirable to resolve the image and clearly identify the nature of the source.

Ground based or ocean based vehicles may also emit detectable infrared signatures. Increasingly, space based or high altitude imaging systems are being utilized to image large areas of geography. Although in the past it has been common to over-fly an area repeatedly or image an area as a series of line scans, real time defense, object(s) identification and tracking may preclude or at least significantly diminish the value of such systems.

So as to achieve a large field of view, and therefore attempt to permit large area imaging as a single operation, optical systems employing an inverse-telephoto lens, sometimes termed a "fisheye" lens, may be employed. Such systems typically have a constant angular resolution across their entire field of view.

The image gathered by such a fisheye lens is typically provided to the focal plane of an infrared detector. The focal plane is typically an array of small pixels, each being operable to generate or pass a current in response to infrared radiation being incident upon the pixel. By processing these generated signals it is of course possible to generate a visual representation of the infrared image, and/or perform identification processes.

Attempts have been made to develop image sensors to compensate for such image blur, as is set forth in U.S. Pat. No. 4,935,629 to Livermore et al. entitled "Detector Array for High V/H Infrared Linescanners." It is of course also noted that Livermore does not teach an imaging system for large area simultaneous imaging, but rather is attempting to resolve a related issue of image blur that also occurs with line scanners viewing ground objects at varying distances.

Such specialized image sensors as proposed by Livermore are likely to be costly to fabricate and have very limited use beyond use in such a disclosed line scanner. As technology advances and new opportunities arise, adaptable technologies are most highly desired so as to help offset the high costs of specialized tooling and manufacturing.

Hence, there is a need for an infrared imaging optical system that overcomes one or more of the issues and problems identified above.

SUMMARY

This invention provides an infrared imaging optical system with a varying focal length over the field of view.

In particular, and by way of example only, according to an embodiment of the present invention, provided is an infrared imaging optical system including: an inverse telephoto lens group having a field of view on the order of at least two radians, the focal length varying across the field of view in a pre-determined fashion; an IR detector optically coupled to the inverse telephoto lens group; and a pupil disposed between the IR detector and the inverse telephoto lens group.

Moreover, according to yet another embodiment of the present invention, provided is an infrared imaging optical system including: an IR detector focal plane disposed within a cold cavity and oriented towards an optical opening in the cold cavity; a pupil proximate to the optical opening; an inverse telephoto lens group optically coupled to the pupil, the lens group structured and arranged to receive infrared light from object space in a field of view and map object space angles onto IR detector focal plane locations such that the angular subtense of a first pixel at the focal plane center is greater than the angular subtense of a second pixel at the focal plane edge.

In yet another embodiment, provided is an infrared imaging optical system including: an inverse telephoto lens group structured and arranged to receive infrared light from a field of view of at least two radians and focus the received light onto a focal plane array detector disposed on the opposite side of a pupil, the telephoto lens group further structured and arranged with a pre-determined varying focal length across the field of view to map object space angles onto focal plane array locations such that an angular subtense of a first detector pixel at the focal plane array center is greater than an angular subtense of a second detector pixel at the focal plane array edge.

BRIEF DESCRIPTION OF THE DRAWINGS

FIG. 5 is an optical prescription for an infrared imaging optical system with varying focal length across the field of view in accordance with at least one embodiment.

DETAILED DESCRIPTION

Before proceeding with the detailed description, it is to be appreciated that the present teaching is by way of example only, not by limitation. The concepts herein are not limited to use or application with a specific system or method for infrared imaging optical systems. Thus, although the instrumentalities described herein are for the convenience of explanation, shown and described with respect to exemplary embodiments, it will be appreciated that the principles herein may be applied equally in other types of systems and methods involving infrared optical systems for image detection.

Figure 1:
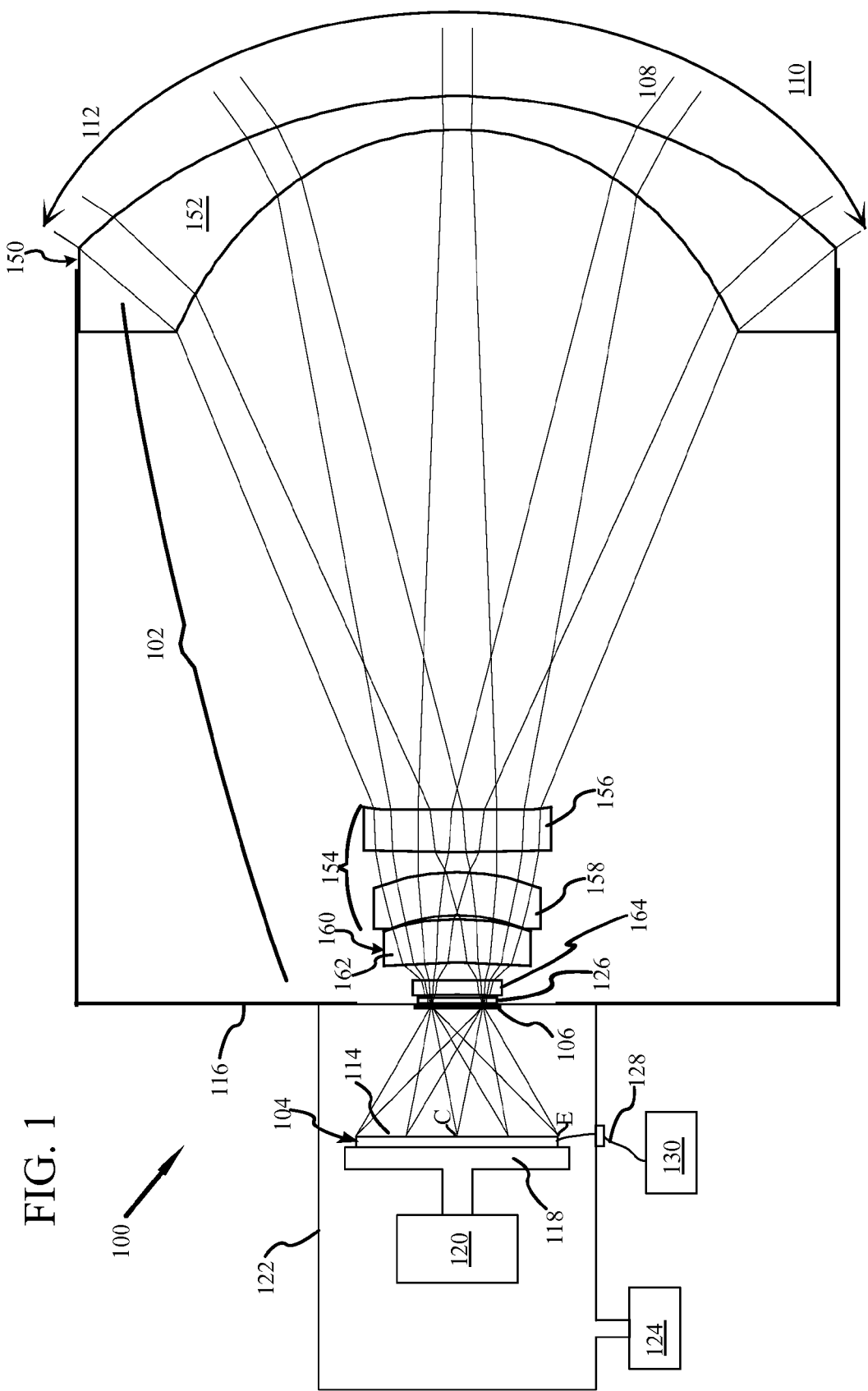
FIG. 1 is a schematic diagram of an infrared imaging optical system with varying focal length across the field of view in accordance with at least one embodiment.

Turning now to the figures, and more specifically to FIG. 1, there is shown an infrared imaging optical system "IIOS" 100 with varying focal length over the field of view. In at least one embodiment, the IIOS 100 is comprised generally of an inverse telephoto lens group 102, an infrared detector 104 (also referred to as an IR detector) optically coupled to the inverse telephoto lens group 102, and an optics pupil 106 disposed between the IR detector 104 and the inverse telephoto lens group 102.

As illustrated by light rays 108, the lens group 102 receives light from the object space 110 over a large field of view 112 and provides these received light rays 108 to the IR detector 104. Specifically, the light is provided to the IR detector focal plane 114. As is further discussed below, the lens group 102 has a pre-determined varying focal length across the field of view 112.

The infrared detector 104 may be selected to be sensitive to any infrared wavelength or range of wavelengths. Preferably, it is sensitive to infrared wavelengths from about 2 to 7 micrometers of wavelength, and more preferably to the mid-wavelength infrared range from about 3 to 5 micrometers in wavelength. Infrared detectors 104 of this type and their manufacturer are generally known in the art. Moreover, in at least one embodiment, the IIOS 100 is advantageously capable of utilizing a known, reliable and off-the-shelf type of IR detector 104.

Typically the inverse telephoto lens group is disposed at least partially within a protective housing 116. The preferred type of IR detector 104 operates most efficiently and effectively at cryogenic temperatures of about 77K. As such, in at least one embodiment the IR detector 104 is mounted to one end of a pedestal 118 that is in turn mounted to a cryostat 120, such as a Joule-Thomson cryostat.

The cryostat 120 is operable to cool the IR detector 104 to an optimum temperature by the conduction of heat through the pedestal 118. To further facilitate this cooling process, the IR detector 104, pedestal 118, and cryostat 120 are all disposed in a vacuum dewar, which additionally provides a cold shield 122. The dewar is vacuum tight, and is evacuated by vacuum pump 124. In at least one embodiment, the cold shield 122 is also referred to as a cold cavity.

An opening, also referred to as a cold stop, or even simply a stop, of the cold shield 122 is coincident in location with the optics pupil 106. The physical opening and the optical pupil therefore both represented by the element number 106. An IR window 126 (window permitting passage of infrared light) is located near (i.e., typically within a few millimeters) the cold stop/pupil 106. In FIG. 1, the separation between the IR window 126 and the cold stop/pupil 106 is not shown due to resolution in the drawing.

For IIOS 100, in at least one embodiment, the pupil 106 is external to the lens group 102. In other words, the pupil 106 is disposed between the lens group 102 and the IR detector 104. The pupil 106 cannot lie within the lens group 102 or the cold cavity 122 would by necessity have to include at least one lens of the lens group 102.

Although such a configuration is possible, such a design is generally not preferred. Placing one or more lenses within the dewar assembly increases the complexity, thermal load, raises issues of optical alignment, and variations in lens performance with extreme cold temperatures. It is also possible that a lens and/or lens support structure within the dewar assembly may radiate heat (i.e., infrared) energy which may produce a background signal that could interfere with the IR detector's detection of received IR light as provided by the lens group 102 from object space 110.

A detailed description of a similar inverse lens group 102, though one not having the herein below described pre-determined varying focal length across the field of view 112 is presented in U.S. Pat. No. 6,989,537 entitled "Compact Inverse-Telephoto Infrared Imaging Optical System" to Lacy G. Cook, the same inventor of the present disclosure, which is incorporated herein by reference.

IR detector 104 converts the incident IR light rays 108 provided by the lens group 102 into an output signal 128 that is processed by image analysis electronics 130. More specifically, IR detector 104 is an array of picture elements, commonly referred to simply as pixels, which provide the IR focal plane 114. Each pixel provides an output signal in response to incident infrared light. By analyzing the combined signal of all pixels in the IR detector 104, a complete image of the object space 110 within the field of view may be realized. As the field of view 112 is large, and specifically intended to be so, how each light ray 108 is delivered to the pixels of the IR detector 104 is significant to appreciating the advantage provided by IIOS 100.

Figure 2:
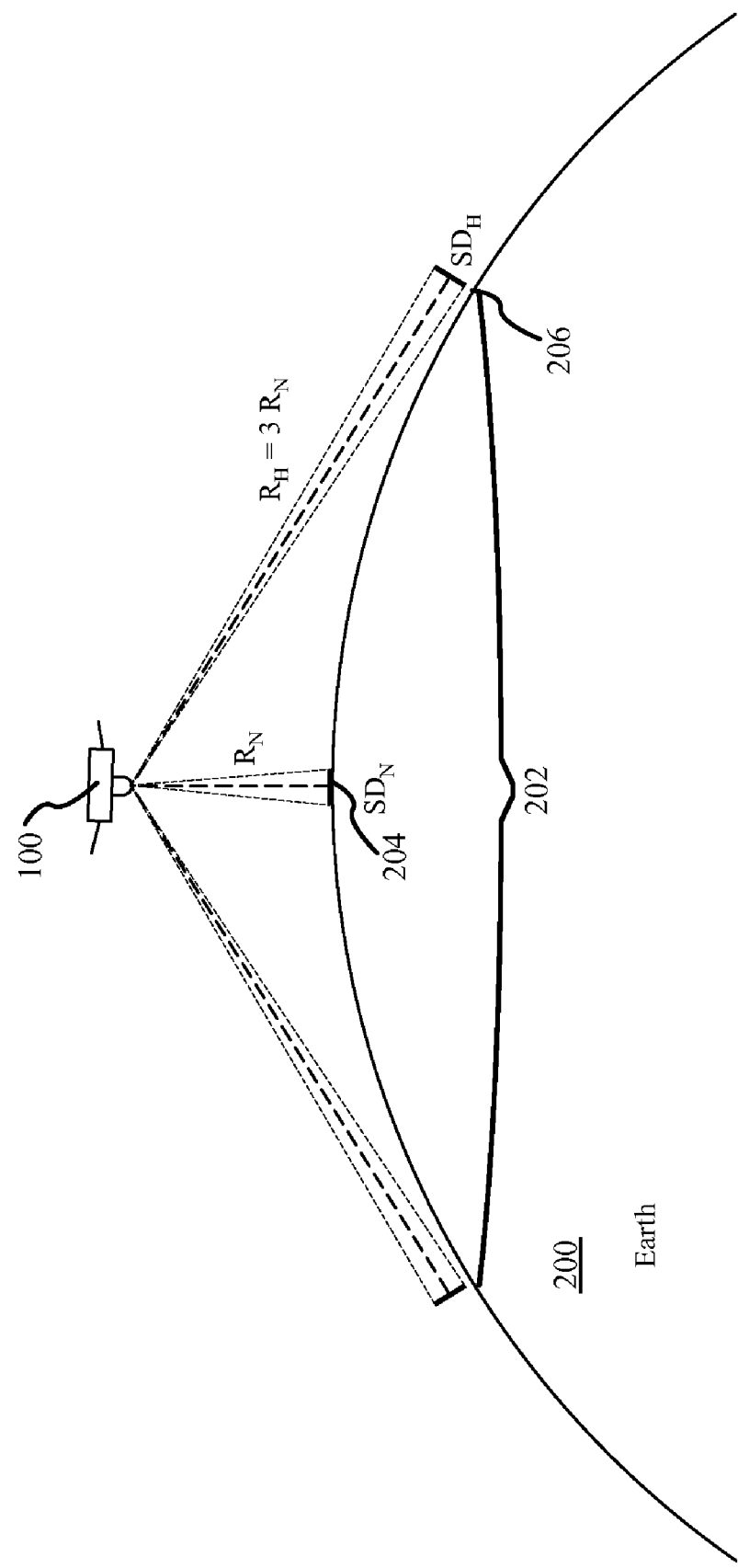
FIG. 2 is a schematic diagram of the infrared imaging optical system with varying focal length across the field of view of FIG. 1 further illustrating the varying range between nadir and the horizon in accordance with at least one embodiment.

FIG. 2 illustrates conceptually at least one issue advantageously resolved by IIOS 100. As shown, IIOS 100 is orbiting the earth 200, and positioned to observe a substantial area of geography within the field of view 202. A first sample area 204 directly below IIOS 100 is understood to be at nadir, and is shown to be at a range nadir, $R_N$.

As noted above, the IR detector 104 has a focal plane 114 that is formed of a plurality of pixels arranged as an array. As such, the image of the ground, e.g., the earth 200 is perceived as being formed of pixels as well. In most cases it is preferable for the ground sample resolution to be consistent throughout the captured image. Therefore the ground sample resolution for a target at nadir is preferably the same as the ground sample resolution for a target at the horizon, as well as anywhere in between nadir and the horizon. The lateral dimension of each target area may be equal to the lateral dimension of ground sample resolution, or may be multiples of the ground sample resolution, but in general is again consistent throughout the entire image. This target area dimension may be referred to as a sample distance, SD.

This first sample area 204, identified as $SD_N$ is determined by Equation 1, wherein IFOV is the angular subtense of a pixel element in the IR focal plane.

$$SD_N = IFOV_N * R_N \qquad \text{Equation 1}$$

A second sample area 206 is at the horizon, or edge of the field of view 202, and therefore has a range $R_H$. In at least one embodiment, $R_H=3*R_N$. This second sample area 206, identified as $SD_H$, is determined by Equation 2:

$$SD_H = IFOV_H * RH_N \qquad \text{Equation 2}$$

As IFOV is equal to sample distance divided by range, with respect to IIOS 100 it is understood and appreciated that it is highly desired that $SD_H=SD_N$. The area average IFOV is 1.00 mrad, however, this varies from 1.32 mrad at Nadir to 0.44 mrad at the horizon. In light of this, the equality of sample distances is provide by Equation 3:

$$IFOV_H = IFOV_N / 3 \qquad \text{Equation 3}$$

For at least one embodiment, such as that conceptually illustrated in FIG. 2, the field of view 202 is at least two radians. A constant effective focal length (EFL), if employed in an imaging system, would therefore require an IR detector with 4.5K×4.5 focal plane array "FPA" (determined by 2 rad/0.44 mrad) to image targets at the horizon. However, as $IFOV_N$ is 1.32 mrad the effective FPA required in that central area is 1.5K×1.5K FPA (determined by 2 rad/1.32 mrad). It must be noted that this effective FPA will not provide the high quality resolution of imaging at the horizon which is truly desired.

Although one potential solution to provide apparent uniform physical resolution is to provide an IR focal plane with more pixels than are truly necessary for all areas of the imaged field of view, such a solution requires additional complexity to adjust the perceived image by discounting or combining pixels in some areas, e.g., the center area. IIOS 100 overcomes these issues to achieve the desired conceptual image in FIG. 3C by varying the focal length in a pre-determined manner over the entire field of view. Moreover, the focal length at a center of the field of view is a first value and the focal length at the edge of the field of view is a multiple of the first value. In at least one embodiment, this multiple is three times the first value.

In other words, the IIOS 100 advantageously provides better images over conventional imaging systems because the angular subtense is not constant. As the sample distance is uniform over the entire image, the pixels at the edge of the image have a smaller angular subtense because they are at a longer range then do the pixels at the center of the image.

Figure 3:
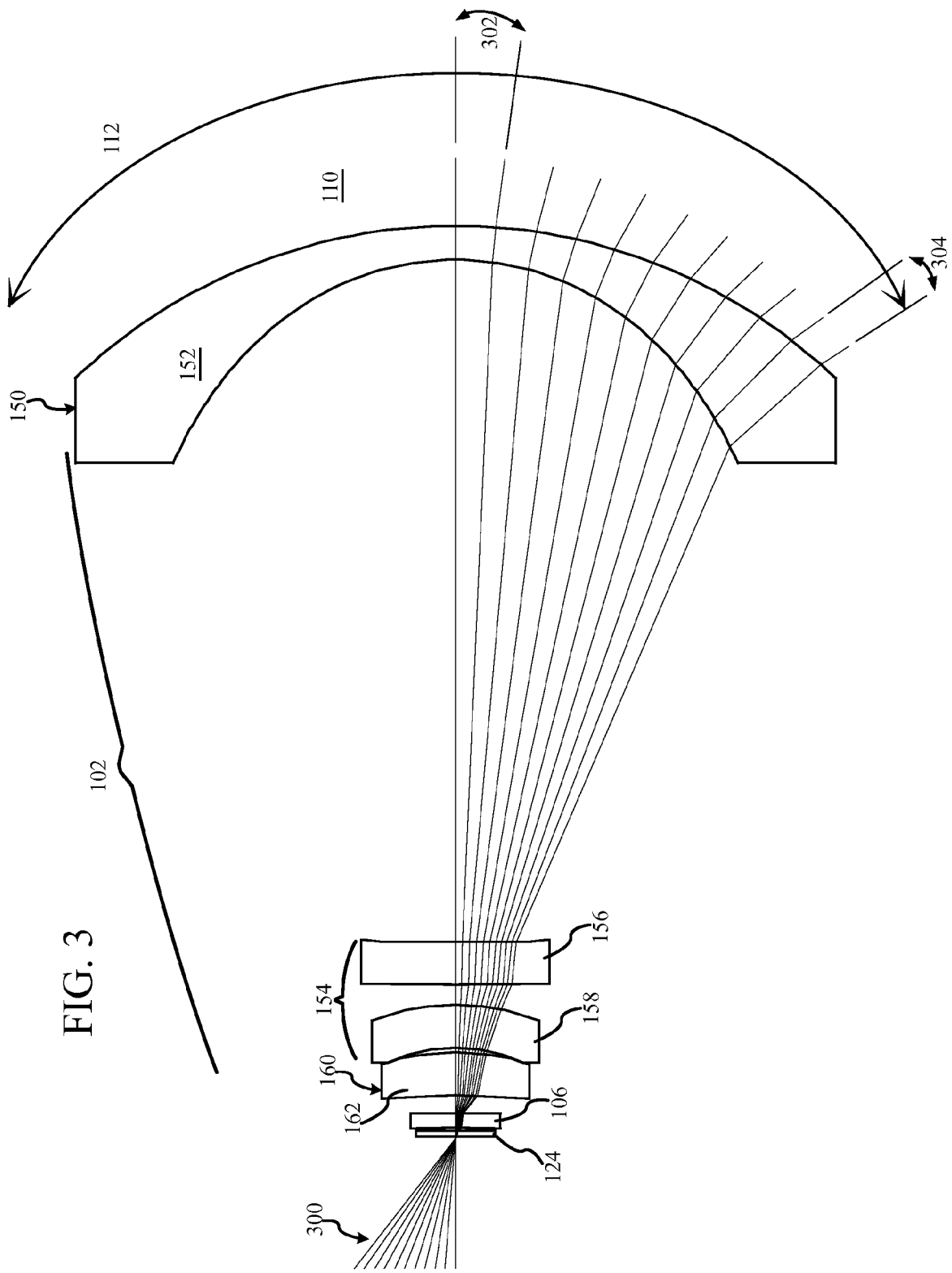
FIG. 3 is a schematic diagram of the lens group of the infrared imaging optical system with varying focal length across the field of view shown in FIG. 1, further illustrating the varying angular subtense of light rays received from object space in accordance with at least one embodiment.

This aspect of the pre-determined varying focal length is more fully appreciated in FIG. 3. In FIG. 3, the lens group 102 of FIG. 1 is shown with other elements removed for viewing clarity. The IR detector 104, which is not shown in FIG. 3, is in at least one embodiment a focal plane array detector. Further still, in at least one embodiment, the FPA is provided as an array of uniformly spaced detector pixels.

With respect to FIG. 3, light rays 300 are shown to have equal increments so as to naturally align to the pixels of the focal plane array. This equal linear spacing at the IR detector is not maintained in angle at the object space 110. For example, there is a first angular difference 302 which is clearly of a greater angle at the center then there is in a second angular difference 304 occurring at the edge.

Indeed, throughout the object space 110 the angular increments grow smaller towards the edge of the field of view 112. Moreover, in at least one embodiment the reduction in angular increment at the edge of the field of view 112 is reduced by a factor of three from the angular increment at the center of the field of view.

To state this another way, the lens group 102 maps object space angles onto focal plane locations upon the IR detector 104 (see FIG. 1). The angular subtense at the center of the IR detector is greater than the angular subtense at an edge of the IR detector. In at least one embodiment, this angular subtense at the center is three times greater than the angular subtense at the edge. This advantageously permits IIOS 100 to utilize an IR detector with fewer pixels then comparable systems. The reduction in pixels while maintaining uniform physical resolution of the detected image permits IIOS 100 numerous advantages, including but not limited to, a savings in weight due to reduced IR detector size. Utilizing a reduced IR detector size also permits a savings in terms of complexity of the signal processing system, bandwidth for transmission of the generated signal and of course cost—to name a few additional points.

Figure 4:
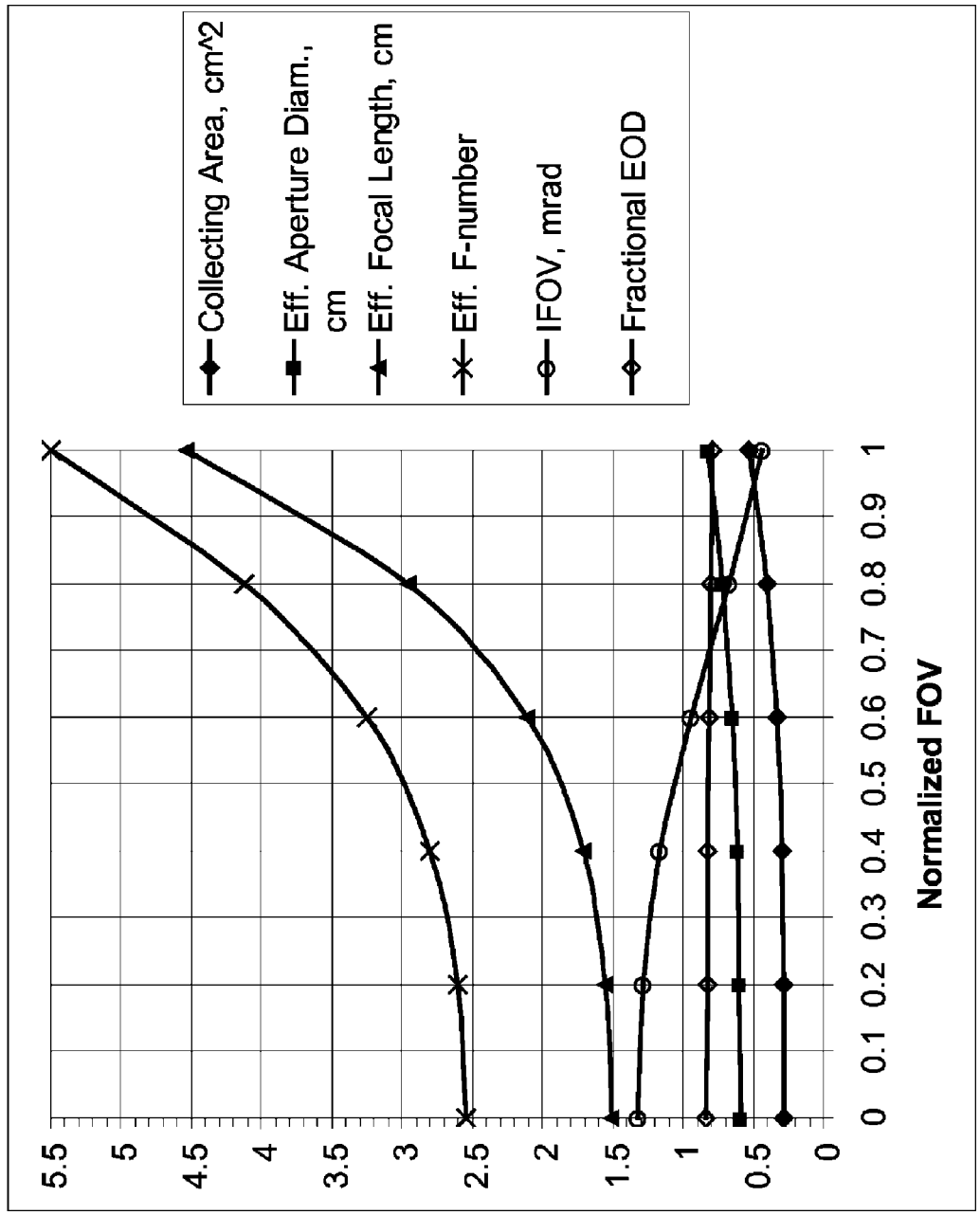
FIG. 4 is a table illustrating the variable pixel subtense and other aspects of the infrared imaging optical system with varying focal length across the field of view of FIG. 3 in accordance with at least one embodiment.

This configuration is further illustrated in the graph presented in FIG. 4. As indicated by the circle line, the varying of the focal length advantageously permits the IFOV values to closely track to those values indicated above for both the center and the edge of the field of view. FIG. 4 also details the field of view variations of six other relevant optical characteristics of IIOS 100. These are: the collecting area—diamond line, the effective aperture diameter—square line, the effective focal length—triangle line, the F-number—cross line, and the fractional EOD (e.g., energy on the detector)—hollow diamond line.

Moreover, in accordance with at least one embodiment and referring again to FIG. 1, IIOS 100 is described as an IR detector focal plane 114 disposed within a cold cavity 122 and oriented towards an optical opening 126 in the cold cavity 122. A pupil 106 is proximate to the optical opening 126. An inverse telephoto lens group 102 is optically coupled to the pupil 106. The lens group 102 is structured and arranged to receive infrared light 108 from object space 110 in a field of view 112 and map object space angles onto IR detector focal plane locations such that the angular subtense of a first pixel at the focal plane 114 center C, is greater than the angular subtense of a second pixel at the focal plane 114 edge E.

In yet another embodiment, the IIOS 100 is described as consisting of an inverse telephoto lens group 102 structured and arranged to receive infrared light 108 from a field of view 112 of at least two radians. This received light 108 is focused onto a focal plane array detector 104 deposed on the opposite side of a pupil 106. The lens group 102 is structured and arranged to have a predetermined varying focal length across the field of view 112 to map object space 110 angles onto focal plane array locations such that an angular subtense of a first detector pixel at the focal plane array center C is greater than an angular subtense of a second detector pixel at a focal plane array edge E.

It should be understood and appreciated that although in at least one embodiment the predetermined varying focal length over the field of view is fixed; in at least one alternative embodiment the varying focal predetermined varying focal length is adjustable. In other words, where the predetermined varying focal length is fixed, it is generally assumed that IIOS 100 will be at a fixed altitude over the geography being imaged. While such a fixed altitude may be known and desired in certain embodiments, such as that of orbiting satellites, in other embodiments the altitude of IIOS 100 may be adjusted. To accommodate such adjustment in altitude, in at least one embodiment, IIOS 100 is structured and arranged so that the advantage provided by the pre-determined varying focal length is maintained, but adjustable so as to accommodate a range of altitudes.

An exemplary specific design has been developed in accordance with at least one embodiment of the IIOS 100 with pre-determined varying focal length and the optical prescription 500 as set forth in FIG. 5, and is understood with respect to the elements shown in FIG. 1. It should be understood and appreciated that it is typical for wide view optical systems to be ray-traced backwards, therefore the optical prescription 500 of FIG. 5 proceeds from the FPA to object space.

The "focus" at surface zero corresponds to the location of the IR detector 104, and more specifically the IR focal plane 114 which is positioned at the precise focal point of the light rays 108. Lens group 102 has a front lens group 150 having a negative optical power, and in at least one embodiment consists of a single front lens 152. Lens group 102 also has an intermediate lens group 154, which in at least one embodiment as shown consists of an inner forward lens 156 and an inner rearward lens 158.

Lens group 102 further has a rear lens group 160, which in at least one embodiment consists of a single and a rear lens 162. In at least one embodiment, the lens group 102 also has a corrector 164 provided to corrects spherical aberration, and as shown this corrector 164 is disposed between the rear lens 162 and the pupil 106.

As the front lens 152 has a negative optical power and the rear lens 162 has a positive optical power, the combination of optical powers permits lens group 102 as a whole to operate in a fisheye manner, with a very wide field of view in both azimuth and elevation. As noted above, in at least one embodiment the field of view 112 is at least two radians.

Preferably, at least two of the lenses (e.g., the front lens 152, inner forward lens 156, inner rearward lens 158, and/or rear lens 162) have at least one aspheric surface thereon. An aspheric surface is a surface that cannot be described by a spheric relation, and typically has higher-order terms. Moreover, in at least one embodiment, each of these identified lenses is relatively thin and has exactly one aspheric surface thereon. As used herein, an "aspheric" surface shape Z is described mathematically by the relation $$z = ch^2/\{1+[1-(1+k)c^2h^2]^{1/2}\} + ADh^4 + AEh^6 + AFh^8 + AGh^{10} +$$

The front lens 152 and the rear lens 162, are preferably made of an infrared-transparent material such as zinc sulfide, zinc selenide, arsenic trisulfide, or amtirl (having a nominal composition of $Ge_{33}As_{12}Se_{55}$). The inner forward lens 156 is preferably made of an infrared-transparent material such as germanium, silicon, or gallium arsenide. The inner rearward lens 158 is preferably made of an infrared-transparent material such as sapphire, spinel, barium fluoride, calcium fluoride, magnesium fluoride, or magnesium oxide.

These materials of construction of the lenses are all transparent to light in the infrared range. These materials have been used for infrared lenses previously, but not for the lenses of inverse-telephoto optical systems in the manner indicated to achieve the surprising and unexpected results obtained with the present approach. Traditional infrared lens materials used for lenses of inverse-telephoto optical systems, silicon and germanium, have indices of refraction well above 3.3, and are not preferred for the lenses of the present approach, except for perhaps their use in the one inner forward lens 156. Additionally, the lens materials of the present approach have superior optical performance over a broader range of the infrared spectrum than do silicon and germanium.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall there between.

What is claimed is:

1. An infrared imaging optical system comprising:
   an inverse telephoto lens group having a field of view on the order of at least two radians and a focal length at an edge of the field of view being a at least three times a focal length at a center of the field of view;
   an IR detector optically coupled to the inverse telephoto lens group; and
   a pupil disposed between the IR detector and the inverse telephoto lens group,
   wherein target area dimensions at each of a plurality of discrete points across the IR detector are equal to each other such that the IR detector provides uniform physical resolution of a detected image across a surface of the IR detector.

2. The infrared imaging optical system of claim 1, further including a cold shield around the detector having an opening therein at the pupil.

3. An infrared imaging optical system comprising:
   an inverse telephoto lens group having a field of view on the order of at least two radians, the focal length varying across the field of view in a pre-determined fashion;
   an IR detector optically coupled to the inverse telephoto lens group; and
   a pupil disposed between the IR detector and the inverse telephoto lens group, the pre-determined varying focal length being adjustable,
   wherein target area dimensions at each of a plurality of discrete points across the IR detector are equal to each other such that the IR detector provides uniform physical resolution of a detected image across a surface of the IR detector.

4. The infrared imaging optical system of claim 1, wherein the varying focal length across the field of view provides resolution of a first value proximate to an edge of the field of view and a resolution of a second value proximate to the center of the field of view.

5. The infrared imaging optical system of claim 1, wherein the system provides uniform physical resolution for all targets within the field of view, at least two imaged targets being at different distances from the system.

6. An infrared imaging optical system comprising
   an inverse telephoto lens group having a field of view on the order of at least two radians, the focal length varying across the field of view in a pre-determined fashion;
   an IR detector optically coupled to the inverse telephoto lens group, the IR detector comprising an array of uniformly spaced detector pixels; and
   a pupil disposed between the IR detector and the inverse telephoto lens group,
   wherein target area dimensions at each of a plurality of discrete points across the IR detector are equal to each other such that the IR detector provides uniform physical resolution of a detected image across a surface of the IR detector.

7. The infrared imaging optical system of claim 6, wherein the inverse telephoto lens group maps object space angles onto focal plane locations upon the IR detector such that angular subtense at a center of the IR detector is greater than angular subtense at an edge of the IR detector.

8. The infrared imaging optical system of claim 7, wherein the angular subtense of the first pixel at the center is three time greater than the angular subtense of the second pixel at the edge.

9. An infrared imaging optical system comprising:
- an IR detector focal plane disposed within a cold cavity and oriented towards an optical opening in the cold cavity;
- a pupil proximate to the optical opening;
- an inverse telephoto lens group optically coupled to the pupil, the lens group structured and arranged to receive infrared light from object space in a field of view and map object space angles onto IR detector focal plane locations such that the angular subtense of a first pixel at the focal plane center is greater than the angular subtense of a second pixel at the focal plane edge,
- wherein a sample distance at the focal plane center is equal to a sample distance at the focal plane edge,
- wherein the equal sample distances at the center and at the edge of the focal plane, in combination with the greater angular subtense of the first pixel with respect to the angular subtense of the second pixel, operate to provide uniform physical resolution of a detected image across the IR detector focal plane.

10. The infrared imaging optical system of claim 9, wherein the field of view is at least two radians.

11. The infrared imaging optical system of claim 9, wherein the lens group has a pre-determined varying focal length across the field of view.

12. The infrared imaging optical system of claim 11, wherein the focal length at a center of the field of view is a first value, the focal length at an edge of the field of view being a multiple of the first value.

13. The infrared imaging optical system of claim 12, wherein the multiple is three times the first value.

14. The infrared imaging optical system of claim 11, wherein the predetermined varying focal length across the field of view of adjustable.

15. The infrared imaging optical system of claim 9, wherein the angular subtense of the first pixel at the center is three times greater than the angular subtense of the second pixel at the edge.

16. The infrared imaging optical system of claim 9, wherein the sample distance at the focal plane center is $SD_N = IFOV_N * R_N$, and the sample distance at the focal plane edge is $SD_H = IFOV_H * R_H$, wherein $SD_N = SD_H$,
- wherein $IFOV_N$ is the angular subtense of the first detector pixel and $R_N$ is an associated nadir range,
- wherein $IFOV_H$ is the angular subtense of the second detector pixel and $R_H$ is an associated horizon range.

17. The infrared imaging optical system of claim 16, wherein
$IFOV_H = IFOV_N/3$.

18. An infrared imaging optical system comprising:
- an inverse telephoto lens group structured and arranged to receive infrared light from a field of view of at least two radians and focus the received light onto a focal plane array detector disposed on the opposite side of a pupil,
- the telephoto lens group further structured and arranged with a pre-determined varying focal length across the field of view to map object space angles onto focal plan array locations such that an angular subtense of a first detector pixel at the focal plane array center is greater than an angular subtense of a second detector pixel at the focal plane array edge,
- wherein the telephoto lens group is further structured and arranged to enable a sample distance at the focal plane array center to be equal to a sample distance at the focal plane array edge,
- wherein the equal sample distances at the center and edge locations of the focal plane array, in combination with the greater angular subtense of the first detector pixel with respect to the angular subtense of the second detector pixel, operate to provide uniform physical resolution of a detected image across a surface of the focal plane array.

19. The infrared imaging optical system of claim 18, wherein the focal length at a center of the field of view is a first value, the focal length at an edge of the field of view being a multiple of the first value.

20. The infrared imaging optical system of claim 19, wherein the multiple is three times the first value.

21. The infrared imaging optical system of claim 18, wherein the angular subtense of the first pixel at the center is three times greater than the angular subtense of the second pixel at the edge.

22. The infrared imaging optical system of claim 18, further including a cold shield around the detector having an opening therein at the pupil.

23. The infrared imaging optical system of claim 18, wherein the predetermined varying focal length across the field of view is adjustable.

* * * * *